US012781780B2

(12) United States Patent
Keene et al.

(10) Patent No.: US 12,781,780 B2
(45) Date of Patent: Nov. 3, 2026

(54) KIT FOR AND METHOD OF ATTACHING THREADED FASTENERS IN CONFINED SPACES

(71) Applicant: Government of the United States as represented by the Secretary of the Air Force, Wright-Patterson AFB, OH (US)

(72) Inventors: Megan Keene, Lackland AFB, TX (US); Andrew Ludwig, Robins AFB, GA (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 171 days.

(21) Appl. No.: 19/010,441

(22) Filed: Jan. 6, 2025

(65) Prior Publication Data

US 2026/0194089 A1 Jul. 9, 2026

(51) Int. Cl.
*F16B 5/02* (2006.01)

(52) U.S. Cl.
CPC .................................. *F16B 5/0216* (2013.01)

(58) Field of Classification Search
CPC ..................................................... F16B 5/0216
See application file for complete search history.

(56) References Cited

U.S. PATENT DOCUMENTS

| | | | | | |
|---|---|---|---|---|---|
| 161,547 | A * | 3/1875 | Raddin | E01B 11/58 | 238/210 |
| 1,061,268 | A * | 5/1913 | Christy | B61D 17/12 | 52/49 |
| 1,131,053 | A * | 3/1915 | Garland | F16B 39/10 | 411/95 |
| 1,440,608 | A * | 1/1923 | Kleist | B21J 7/42 | 72/439 |
| 2,188,119 | A * | 1/1940 | Prentice | E21B 17/1078 | 166/233 |
| 2,729,043 | A * | 1/1956 | Frank | A01B 23/06 | 172/599 |
| 4,750,390 | A | 6/1988 | Batten | | |
| 6,345,925 | B1 | 2/2002 | Coleman | | |
| 8,555,481 | B2 | 10/2013 | Porter | | |
| 11,426,844 | B2 | 8/2022 | Koppenhoefer | | |
| 11,912,355 | B2 * | 2/2024 | Berube | B62D 55/32 | |

(Continued)

*Primary Examiner* — Kenneth L Thompson

(74) *Attorney, Agent, or Firm* — AFMCLO/JAZ; Larry L. Huston

(57) ABSTRACT

A kit for joining two workpieces in a confined space using a threaded fastener. The kit has two plates which sandwich the workpieces. The plates have at least one pair of matched central holes through which a bolt is inserted. The bolt is captured with a hex countersink, negating the need for a tool behind the head to resist torque applied to a nut threaded onto that bolt. The plates also have matched pairs of outboard holes which do not overlap the workpieces. Rods, such as hex bolts, are inserted through a matched outboard hole pair. The rods react against edges of the workpieces to resist clockwise and counterclockwise applied torque. The nut can then be attached to the bolt through the central hole using a conventional tool, such as a ratchet wrench. There is no need for a ratchet wrench or other tool to apply counter-torque to the head of that bolt.

20 Claims, 10 Drawing Sheets

(56) References Cited

U.S. PATENT DOCUMENTS

| | | | | |
|---|---|---|---|---|
| 2007/0062610 | A1 * | 3/2007 | Taylor | B27J 1/02 147/48 |
| 2007/0258792 | A1 | 11/2007 | Pavlov | |

* cited by examiner

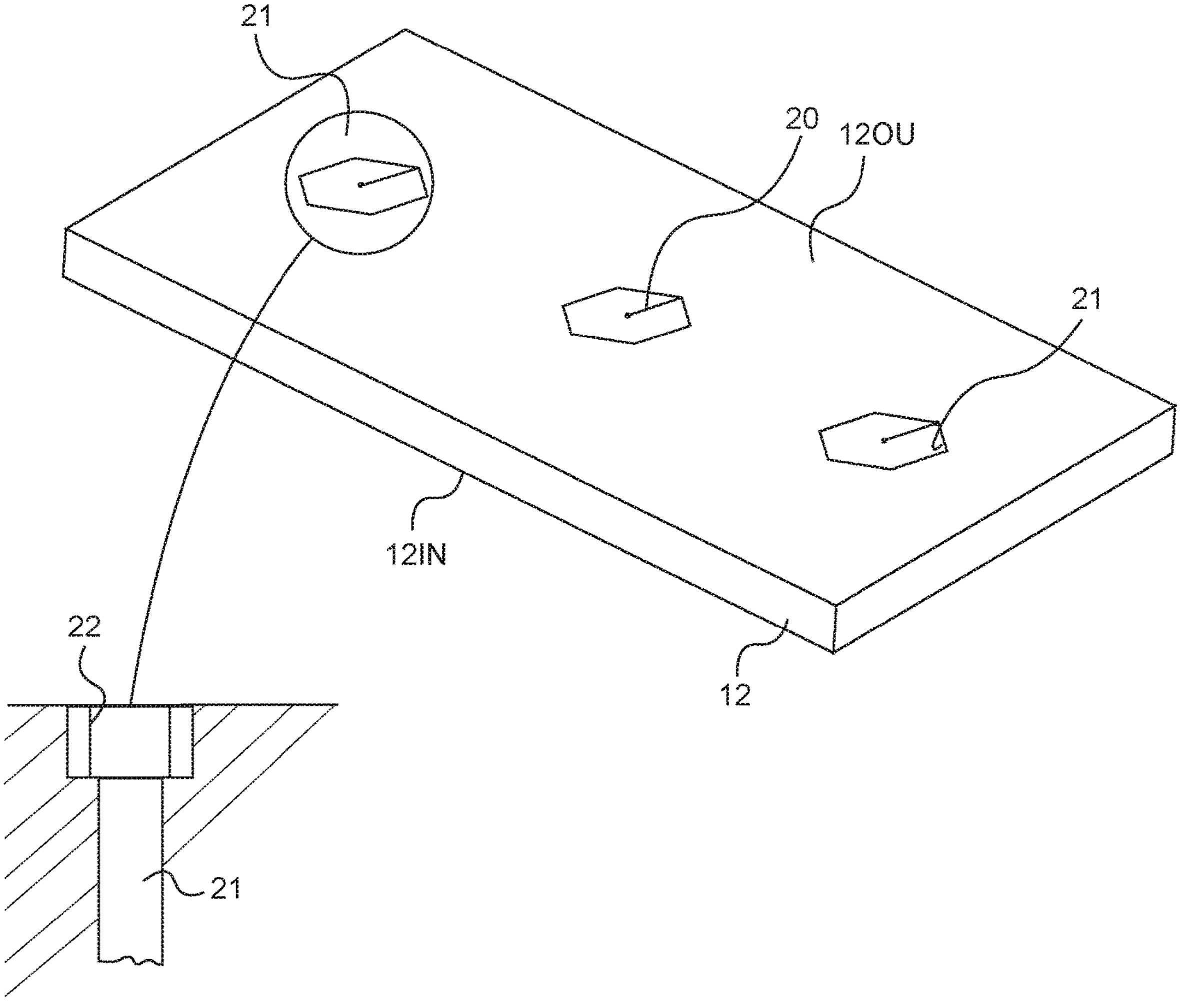
FIG. 2A2
FIG. 2A1

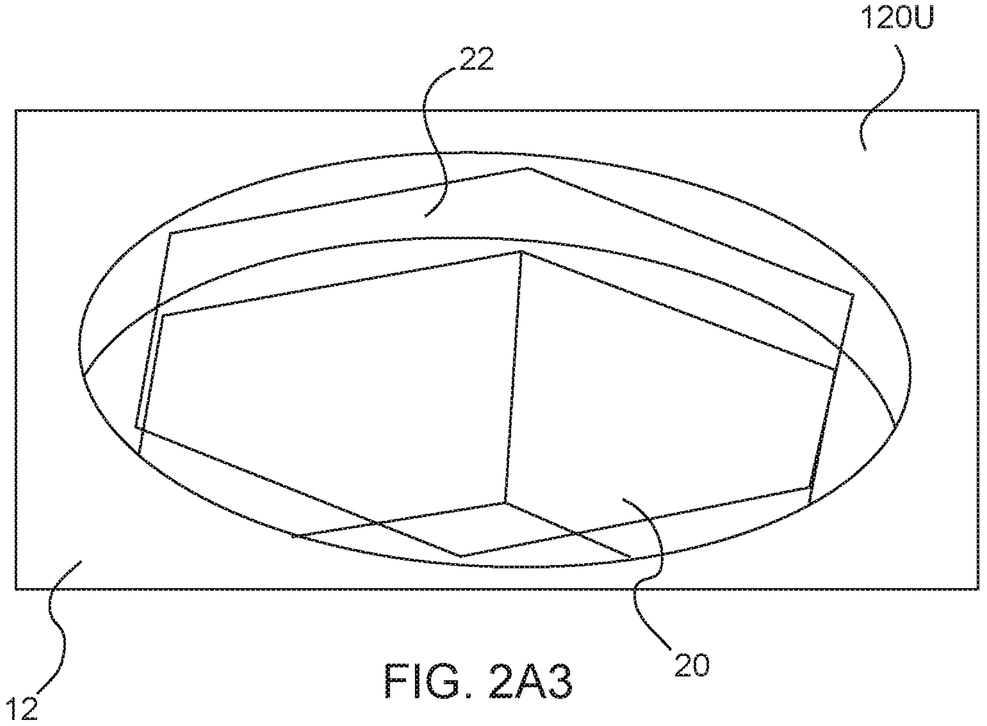
FIG. 2A3
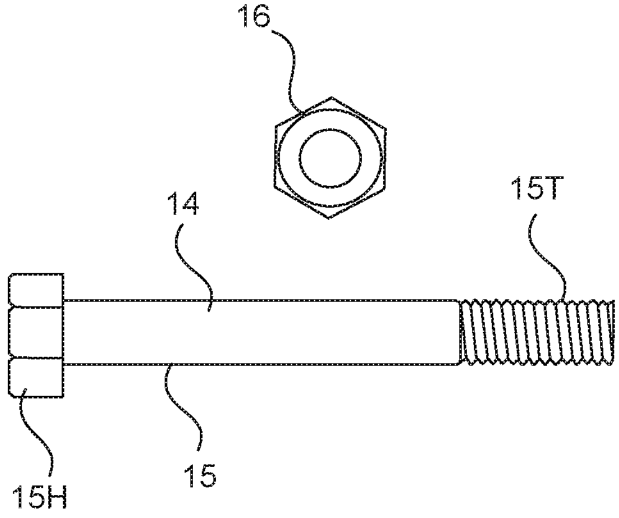
FIG. 2A4

KIT FOR AND METHOD OF ATTACHING THREADED FASTENERS IN CONFINED SPACES

STATEMENT OF GOVERNMENT INTEREST

The invention described and claimed herein may be manufactured, licensed and used by and for the Government of the United States of America for all government purposes without the payment of any royalty.

FIELD OF THE INVENTION

The present invention is related to a kit and method for joining two workpieces together with threaded fasteners and more particularly for such a kit and method with do not require a separate tool to resist torque applied to the threaded fasteners.

BACKGROUND OF THE INVENTION

Joining workpieces together with threaded fasteners goes back several decades. Threaded fasteners include externally threaded bolts and complementary internally threaded nuts. The bolts may have any suitable head, with hex bolts and a hexagonal head larger than the shank of the bolt being preferred. The nuts and bolts are attached using rotatably applied torque. The torque is applied in an onward direction, typically clockwise, to the nut and resisted in the opposite and counter-rotating direction by the bolt.

But throughout the decades the workpieces have been in confined spaces, where it is difficult, unsafe or poorly ergonomic to apply counter torque to the bolt. Various wrenches have been proposed for these confined spaces. But these wrenches are specialized, often not worth purchasing for just a single application and can be expensive. Accordingly, a new approach is needed which does not require esoteric tools and avoids the problems cited above.

SUMMARY OF THE INVENTION

In one embodiment the invention comprises a kit for assembling and disassembling a threaded fastener in confined spaces. The kit comprises a first plate having a first plate outer surface and a first plate inner surface opposed thereto, and three primary holes therethrough, a central primary fastener hole having a diameter complementary to a bolt to be inserted therein and two outboard primary holes flanking the central primary fastener hole, each outboard primary hole sized to receive a complementary support rod therethrough, the central primary fastener hole having a hexagonal countersink on the outboard face. The kit also has a second plate having a second plate outer surface and a second plate inner surface opposed thereto and three secondary holes therethrough, a central secondary fastener hole having a diameter complementary to a socket for a nut to secure the bolt to be inserted therein and two outboard secondary holes flanking the central secondary fastener hole, each outboard secondary hole sized to receive the complementary support rod therethrough, the three primary holes and the three secondary holes being matched, whereby a bolt inserted through the central primary fastener hole and the central secondary fastener hole can have a nut applied thereto or removed therefrom without rotation of the first plate or second plate, the rotation being resisted by a support rod inserted through at least one matched pair of an outboard primary outboard hole and an outboard secondary hole.

In another embodiment the invention comprises a method of joining two workpieces together. The method comprising the steps of providing two plates, a first plate having a first plate outer surface and a first plate inner surface opposed thereto, and three primary holes therethrough, a central primary fastener hole having a diameter complementary to a bolt to be inserted therein and two outboard primary holes flanking the central primary fastener hole, each outboard primary hole sized to receive a complementary support rod therethrough, the central primary fastener hole having a hexagonal countersink on the outboard face and a second plate having a second plate outer surface and a second plate inner surface opposed thereto and three secondary holes therethrough and matched to the position of the three primary holes, a central secondary fastener hole having a diameter complementary to a socket for a nut to secure the bolt to be inserted therein and two outboard secondary holes flanking the central secondary fastener hole, each outboard secondary hole sized to receive the complementary support rod therethrough; juxtaposing the first plate and second plate with a first workpiece and a second workpiece to be joined together and having a respective first workpiece hole therethrough and a second workpiece hole therethrough; inserting a first rod through one of the first plate outboard holes and through a corresponding second plate outboard hole to resist torque in a clockwise direction; inserting a hex bolt through the central primary fastener hole, the first workpiece hole, the second workpiece hole and the central secondary fastener hole in turn whereby a head of the hex bolt is disposed in the countersink of the first plate and a threaded shank of the hex bolt protrudes though the second plate; threading a nut onto the threaded shank of the hex bolt; rotating a socket over the nut to thereby join the first workpiece and second workpiece together. Either the step of inserting the first support rod, inserting a second support rod or inserting the hex bolt can be performed first or last.

BRIEF DESCRIPTION OF THE DRAWINGS

FIG. 2A1 is a scale perspective view of a first plate according to the present invention.

FIG. 2A2 is an enlarged fragmentary sectional view of the outboard hole in FIG. 2A1.

FIG. 2A3 is a scale enlarged perspective view of a hexagonal countersink in the plate of FIG. 2A1.

FIG. 2A4 is a scale hex bolt and nut usable with the kit of the present invention.

FIG. 4 is a scale perspective view of a kit according to the present invention being disposed on a workpiece.

DETAILED DESCRIPTION OF THE INVENTION

Figure 1A:
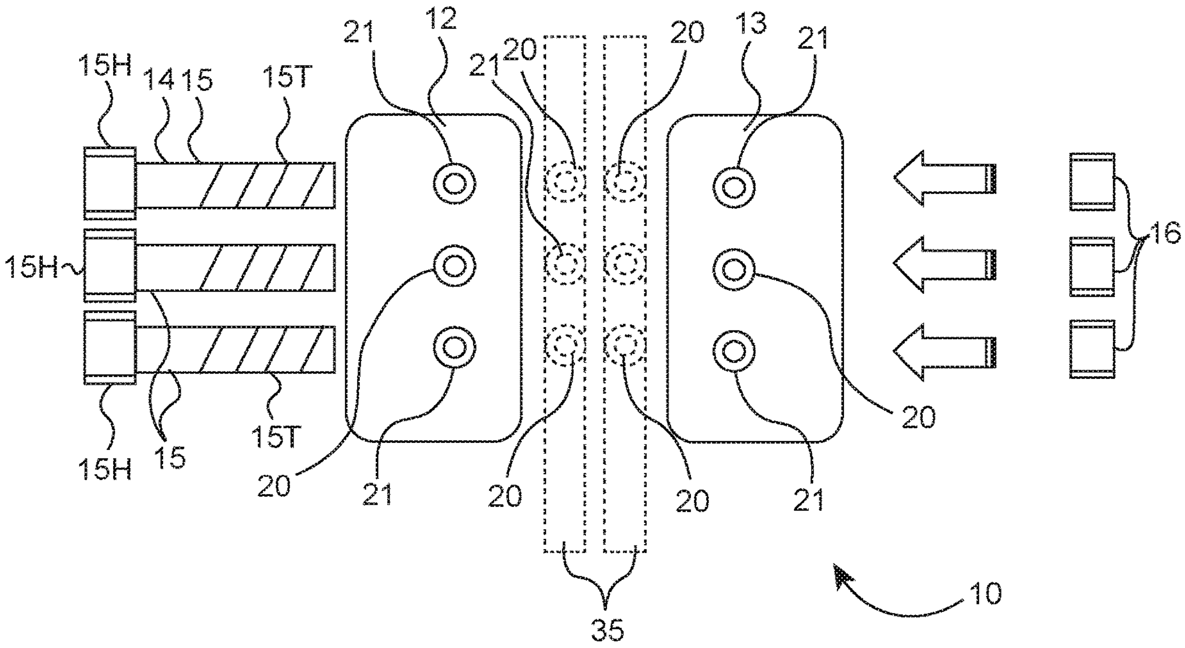
FIG. 1A is an exploded schematic side elevational view of a kit according to the present invention, showing two workpieces in phantom and rotated 90 degrees about the vertical axis. The nuts are rotatably applied to the corresponding bolts in the directions of the arrows.
Figure 1B:
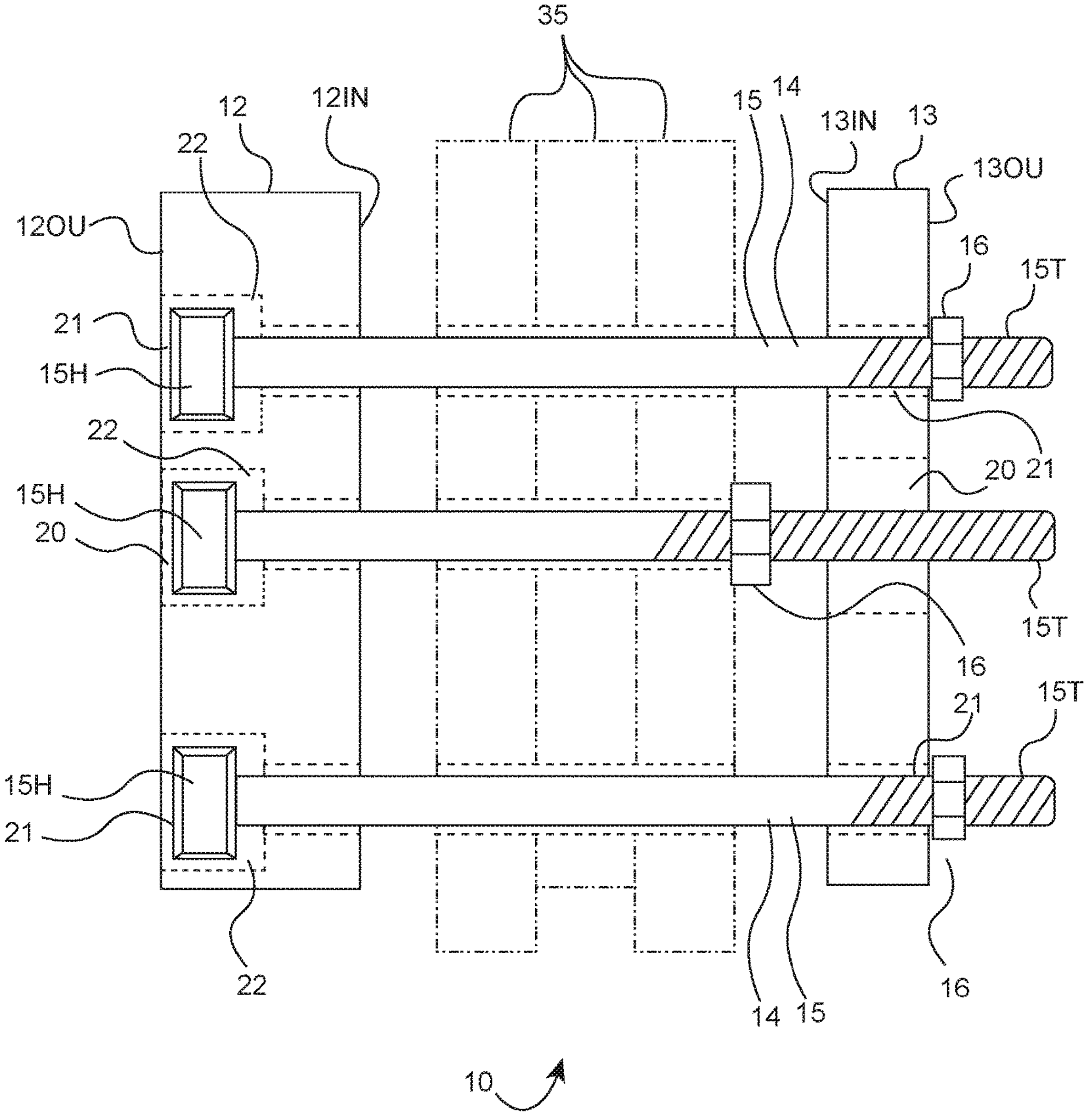
FIG. 1B is a partially exploded side elevational view of a kit according to the present invention having three workpieces shown in phantom.

Referring to FIG. 1A and FIG. 1B, the kit 10 according to the present invention comprises at least a first plate 12 and a second plate 13, with each plate having at least three matched holes. The kit 10 further comprises at least two support rods 14. The kit 10 is useful to join together two or more workpieces 35 with elongate threaded fasteners, such as a nut 16 and bolt 15.

Examining the invention in more detail, the first plate 12 has a first plate 12 outer surface 12OU which is outwardly oriented when the kit 10 is in use and a first plate 12 inner face opposed thereto and which generally faces towards the workpieces 35 while the kit 10 is in use. Likewise, the second plate 13 has a second plate 13 outer surface 13OU which is outwardly oriented while the kit 10 is in use and a second plate 13 inner face opposed thereto and which generally faces towards the workpieces 35 while the kit 10 is in use.

The first plate 12 and second plate 13 may be generally parallelepipedal shaped as shown or may be of any suitable shape. The first plate 12 and second plate 13 may be flat as shown or slightly convex or concave.

The first plate 12 has a central primary fastener hole 20 flanked by at least two outboard primary holes 21. Likewise the second plate 13 has a central secondary fastener hole 20 flanked by at least two outboard secondary holes 21. The terms central primary fastener hole 20, central primary hole 20 and primary central hole 20 are used interchangeably herein. Likewise, the terms central secondary fastener hole 20, central secondary hole 20 and secondary central hole 20 are used interchangeably herein.

The primary central hole 20 and the secondary central hole 20 are considered to be matched if a complementary threaded fastener perpendicularly inserted therethough can be inserted though both the primary central hole 20 and the secondary central hole 20. Likewise a primary outboard hole 21 and a secondary outboard are considered to be matched if a complementary threaded fastener perpendicularly inserted therethough can be inserted though both the primary outboard hole 21 and the secondary outboard hole 21. It should be noted that all of the primary central hole 20, secondary central hole 20, primary outboard holes 21 and secondary outboard holes 21 must be simultaneously matched for the kit 10 to be effective.

The primary outboard hole 21 and secondary outboard hole 21 preferably do not overlap the workpieces 35. This arrangement provides the benefit that the support rods 14 may brace against an edge of the workpieces 35 to resist the torque rotatably applied in either direction to the nut 16. This arrangement advantageously eliminates the need for a tool behind the head 15H of the bolt 15 through the primary central hole 20, conserving space at that position.

The support rods 14 may comprise threaded fasteners such as a threadbly attachable nut 16 and bolt 15. Or the support rods 14 may comprise simple cylindrical rods 14 if, suitable for retaining in place while carrying out the method of the present invention.

While the invention is described in terms of round primary outboard holes 21 and round secondary outboard holes 21, one of skill will understand the invention is not so limited. The primary outboard holes 21 and round secondary outboard holes 21 may be of any suitable cross section so long as the rod 14 is complementary thereto. While paired primary outboard holes 21 and secondary outboard holes 21 are shown to be of equivalent size and shape, one of skill will recognize the invention is not so limited. A matched primary outboard hole 21 and secondary outboard hole 21 pair may be different than a counterpart pair. The paired primary outboard holes 21 and secondary outboard holes 21 and paired primary central hole 20 and secondary central hole 20 may be perpendicular to either or both respective faces 12OU, 12IN, of the first plate 12 and respective faces 13OU, 13IN, of the second plate 13 as shown, or may be skewed relative thereto.

When the kit 10 is in use, the first plate 12 and the second plate 13 sandwich one or more workpieces 35 therebetween. The inner faces 12IN, 13IN are oriented towards the workpieces 35 in use. The outer faces 12OU, 13OU are outwardly facing and oriented away from the workpieces 35. A bolt 15 is inserted through the primary central hole 20, at least one workpiece 35 and the secondary central hole 20 in turn. The bolt 15 is secured by a nut 16 against the workpiece. A support rod 14 is inserted through at least one pair of matched primary and secondary outboard holes 21 and preferably two support rods 14 are inserted through two pairs of matched primary and secondary outboard holes 21. The support rods 14 are preferably a bolt 15 and nut 16 threadably attached thereto. Such bolts 15 may be inserted through the first plate 12 and nut 16 attached against the second plate 13. Or the bolts 15 may be inserted through the secondary plate and the nut 16 attached against the first plate 12. Or the bolts 15 may oppositely disposed with one bolt 15 oriented in each direction. The workpieces 35 can be any two or more components or portions thereof desired to be held together by a threaded fastener.

Referring to FIG. 2A1, FIG. 2A2 and FIG. 2A3, primary central hole 20 of the first plate 12 outer surface 12OU has a hexagonal countersink 22. The countersink 22 intercepts and receives the head 15H of a complementary hex bolt 15, it being understood such head 15H has a hexagonal cross section. The countersink 22 preferably, but not necessarily, has a depth sufficient to intercept the full depth of the head 15H of the bolt 15, so that the bolt 15 does not extend outwardly of the first plate 12 outer surface 12OU. This arrangement provides the benefit that the kit 10 may be used in confined spaces without interference from the head 15H of the bolt 15.

A confined space is a space having limited clearance behind the head 15H of a hex bolt 15 used to join two workpieces 35 together. The limited clearance, taken in the longitudinal direction of the bolt 15, makes it difficult, ergonomically challenging or unsafe to apply counter-torque to the head 15H of a bolt 15 or to a nut 16 used to join the workpieces 35 together.

A pair of central holes 20 on the first plate 12 and the second plate 13 overlap the workpieces 35 so that a bolt 15 can be inserted therethough to compressively joined the workpieces 35 together. At least one matched pair of central holes 20 is required, although the kit 10 may provide for plural pairs of matched central holes 20 and a like number of threaded fasteners to compressively join the workpieces 35 together.

Below the countersink 22 the first plate 12 has sufficient thickness to carry out the intended function without failure or undue distortion. Below the countersink 22 the primary central hole 20 is preferably round, to accept the shank of the bolt 15. It is understood that the below direction is from the first plate 12 outer surface 12OU towards the first plate 12 inner surface 12IN.

Optionally the outboard primary holes 21 may have a countersink 22. This arrangement advantageously provides for the support rods 14 to also be executed as threaded fasteners comprising a hex bolt 15 in each outboard primary hole 20. Optionally such bolts 15 may be secured in place by a nut 16.

Figure 4:
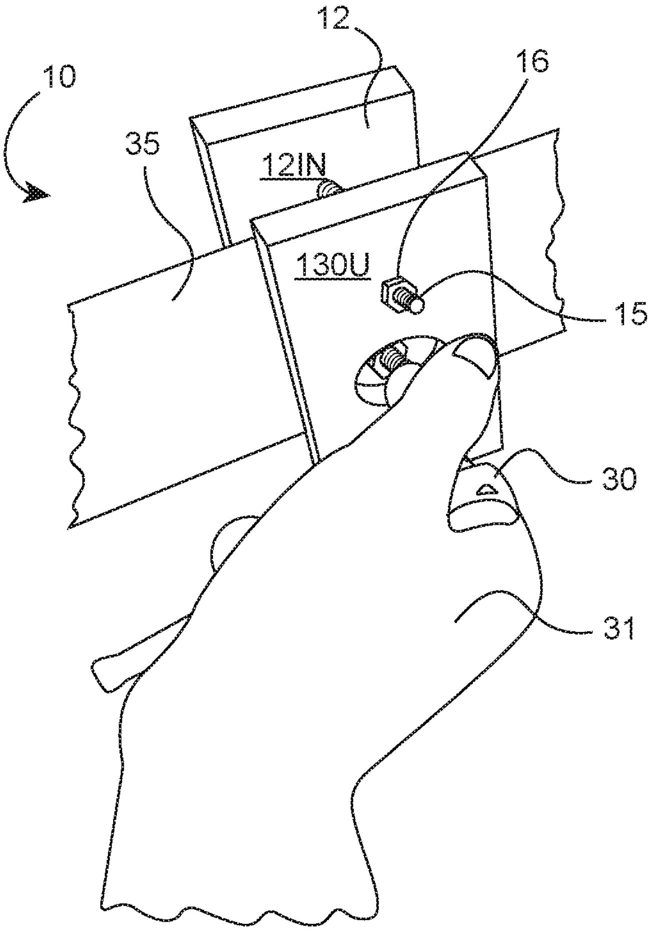

Referring to FIG. 2A4, the threaded fastener usable with the present invention comprises a bolt 15 and typically a complementary nut 16. A nut 16 and bolt 15 are complementary if they can be threadably attached and detached, i.e. matched pitch and nominal diameters. The bolt 15 is shown as a hex bolt 15, although the invention is not so limited, except as specified in the following claims. Allen bolts 15, Torx bolts 15, carriage bolts 15, etc. may be used as desired. The bolt 15 may be partially threaded with threads 15T as shown or may be entirely threaded with threads 15T from the head 15H to the distal end. For common applications the bolt 15 may have a nominal length ranging from 10 cm to 25 cm.

The nut 16 is preferably a hex nut 16, although the invention is not so limited, except as specified in the following claims. The nut 16 may be a square nut 16, etc. Either or both of the bolt 15 and nut 16 may have thread 15T lock adhesive, spring washers or other retaining features as are known in the art. Threaded fasteners may further comprise a flat washer.

Figure 2B:
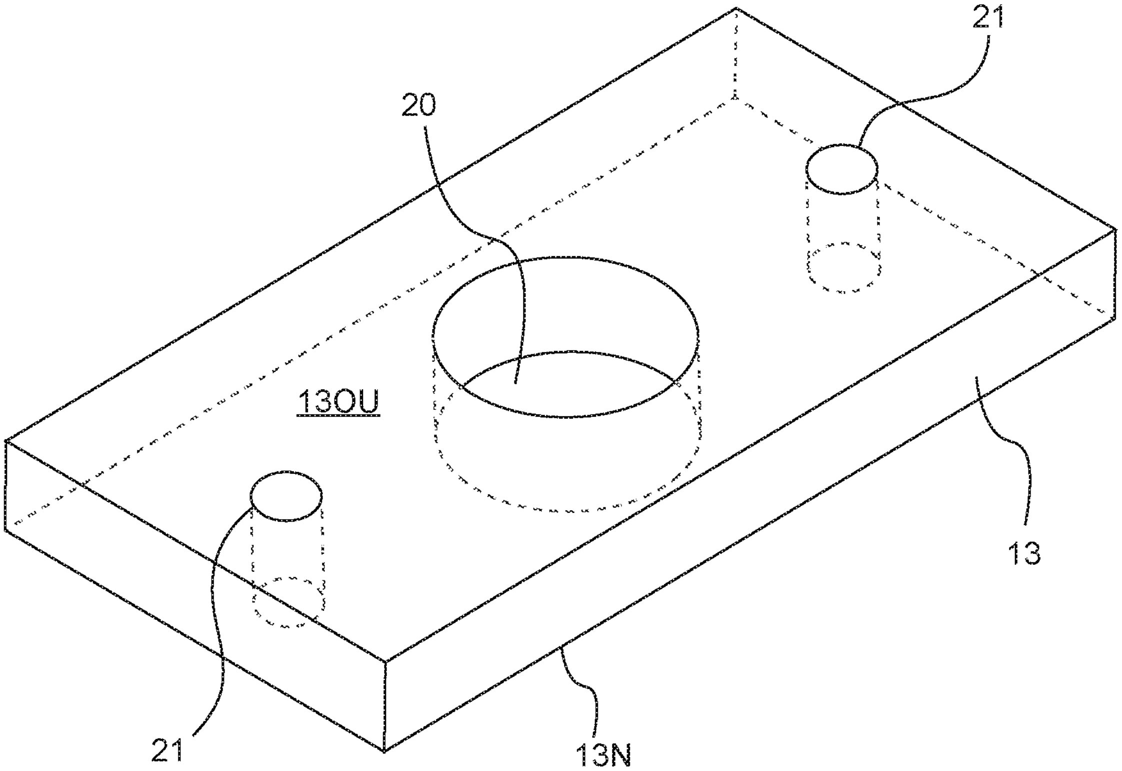
FIG. 2B is a perspective view of a second plate according to the present invention.

Referring to FIG. 2B, the second plate 13 has a central secondary hole 20 coaxial with the central primary hole 20. The central secondary hole 20 has a diameter sufficient to accommodate a socket for the nut 16 and bolt 15 combination. The socket applies torque to the nut 16 in either the threadably rotatably attaching or threadably rotatably removing directions. While the kit 10 is shown with a hex bolt 15 captured in the countersink 22 of the first plate 12, the invention is not so limited, except as specified in the following claims. In an alternative embodiment, the nut 16 may be captured in the countersink 22 of the first plate 12 and the head 15H of the bolt 15 applied to the outer face of the second plate 13.

The outboard secondary holes 21 are matched in position to the outboard primary holes 21. The outboard secondary holes 21 may have a diameter equivalent to the diameter of the outboard primary holes 21 or may be smaller or larger in diameter, as desired. The outboard primary holes 21 and outboard secondary holes 21 may be of constant diameter as shown or may be tapered in either direction.

Figure 3A:
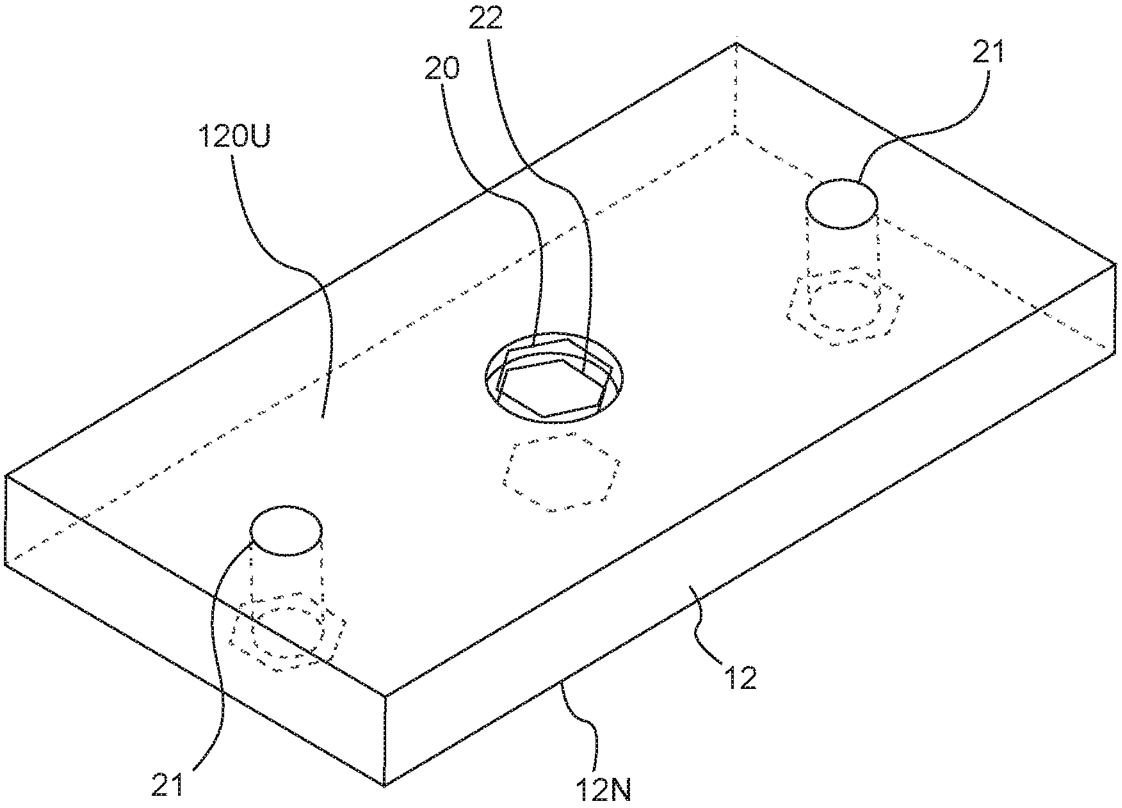
FIG. 3A is a scale perspective view of an alternative first plate according to the present invention.

Referring to FIG. 3A, in an alternative embodiment, the first plate 12 may have primary outboard holes 21 which do not have a hex countersink 22 or other countersink 22. This geometry provides the benefit of simplicity of manufacture.

Figure 3B:
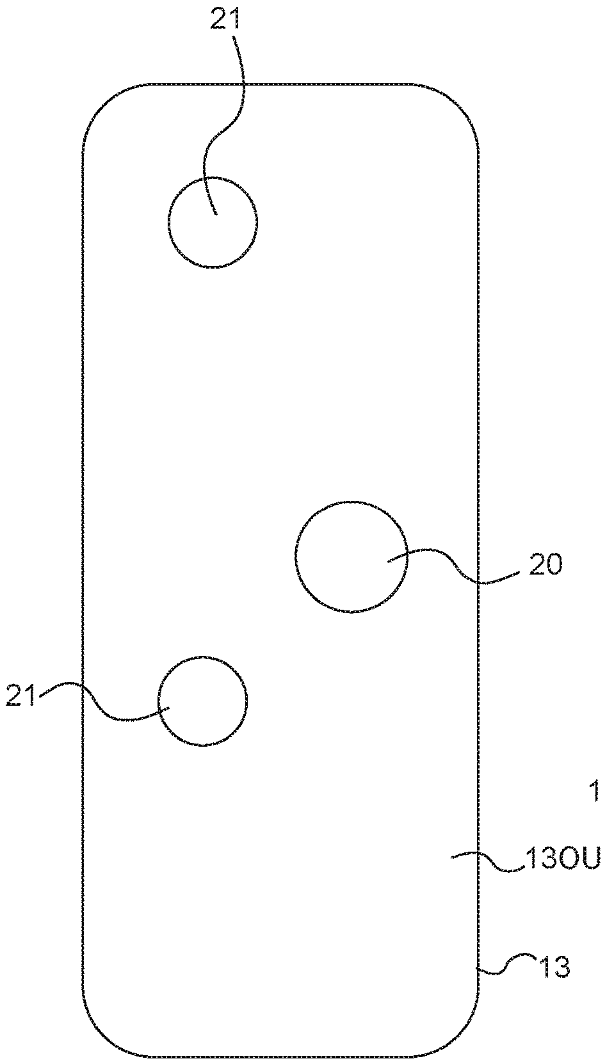
FIG. 3B is a scale frontal view of an alternative second plate according to the present invention.

Referring to FIG. 3B, in an alternative embodiment the second plate 13 may have a central secondary hole 20 and outboard secondary holes 21 which are not collinear. This arrangement provides the benefit that the kit 10 may be tailored to a specific application. It is understood that the central primary hole 20 and outboard primary holes 21 are matched to allow insertion of the bolt 15 and support rods 14 therethrough.

Figure 3C:
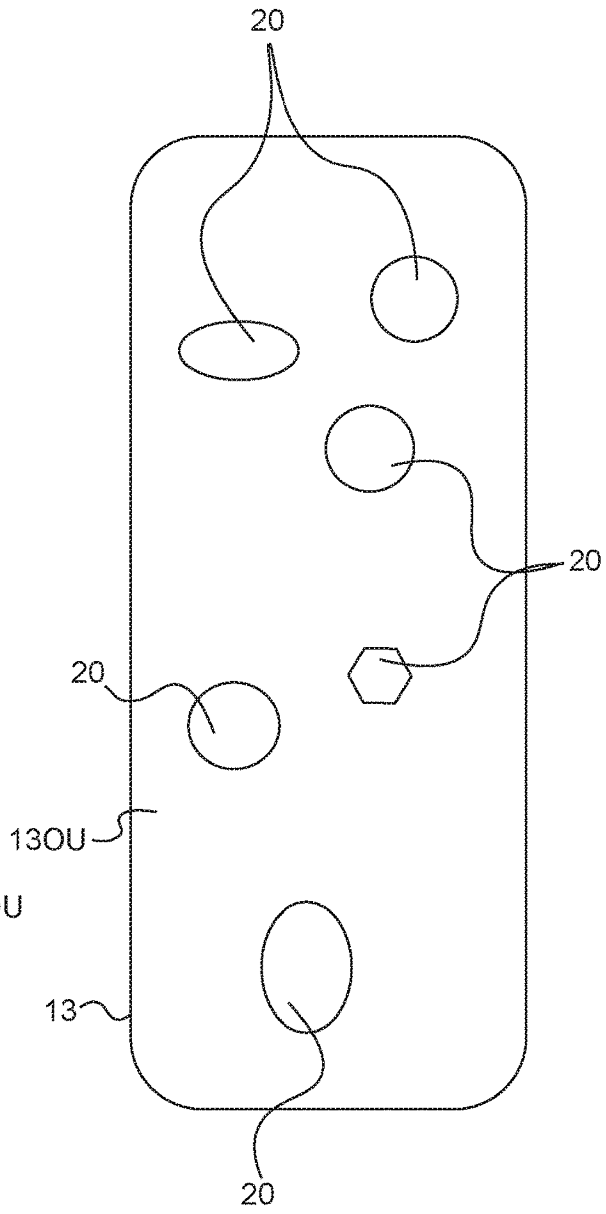
FIG. 3C is a scale frontal view of another alternative second plate according to the present invention.

Referring to FIG. 3C, in another alternative embodiment the second plate 13 may have a hexagonal central hole 20. This arrangement provides for an option to easily capture the head 15H of the hex bolt 15 and reverse the direction of the bolt 15 as shown. This embodiment further has elliptical holes 21*s*, providing flexibility for the kit 10 to be used in various applications as needed. This embodiment further has asymmetric outboard secondary holes 21. This arrangement provides even more flexibility for the kit 10 to be used in various applications as needed.

Referring to FIG. 4, in use the first plate 12 and second plate 13 may be attached to the workpieces 35 with one or more bolts 15 through the outboard holes 21. Nuts 16 may optionally be used with the bolts 15 through the outboard holes 21. The bolt 15 is inserted through the primary central hole 20 and secondary central hole 20. The nut 16 is threadably attached to this bolt 15 using a conventional wrench 30 or a ratchet and socket wrench 30 combination operated by hand 31 as are known in the art. This kit 10 advantageously eliminates the need for a wrench 30 or ratchet and socket combination 30 to apply counter-torque to the head 15H of the bolt 15, as may be difficult or unsafe in confined spaces.

Figure 5:
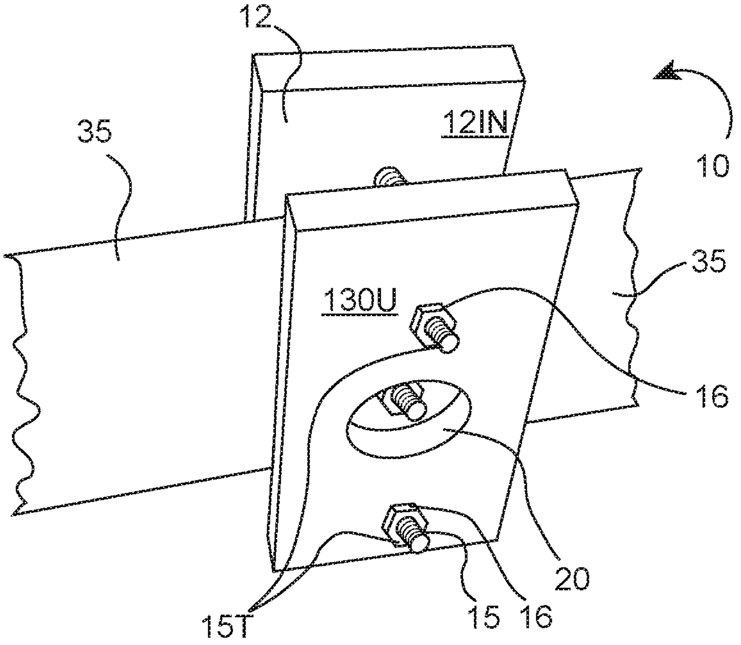
FIG. 5 is a scale perspective view of the kit of FIG. 4 installed on a workpiece.
Figure 6A:
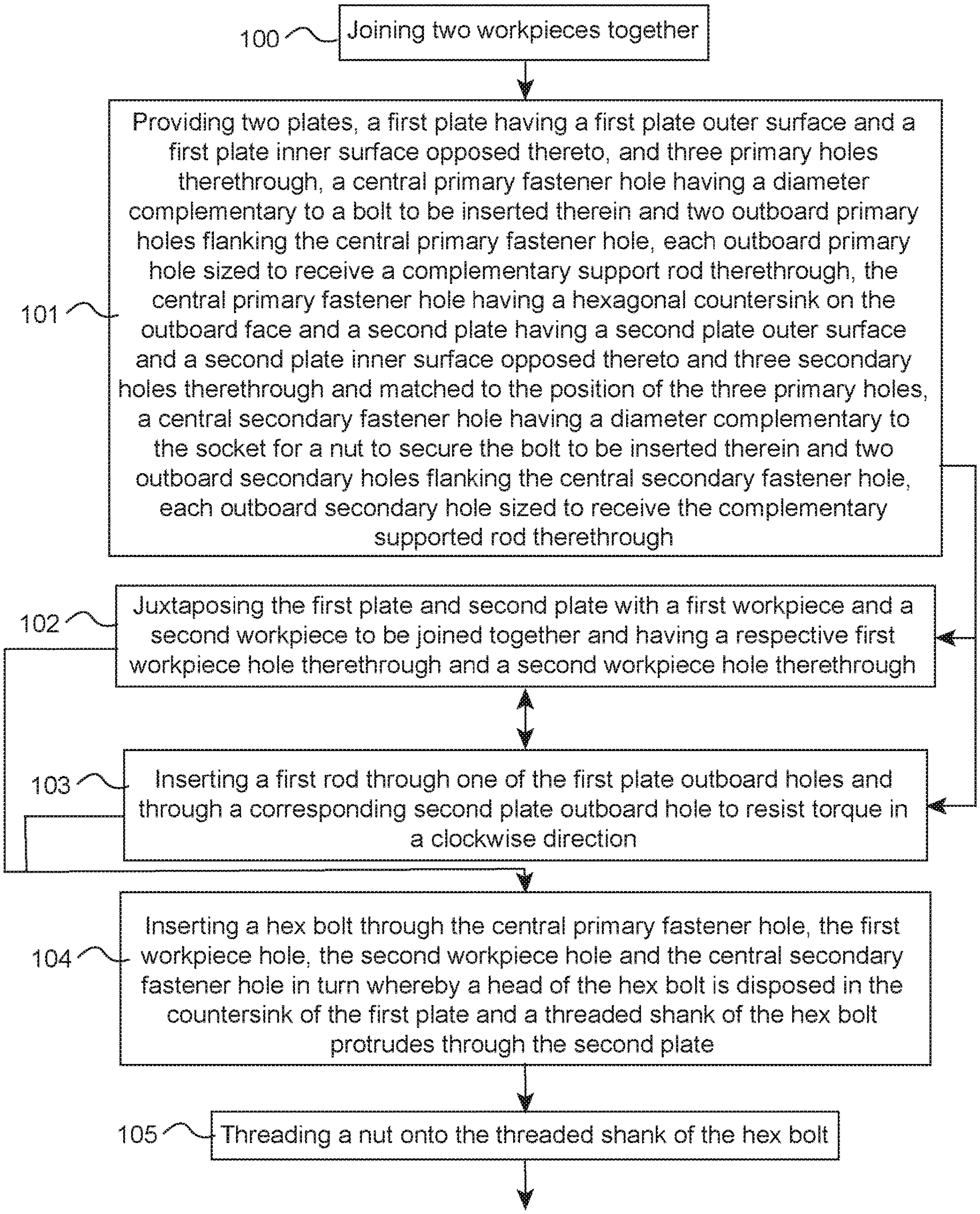
FIG. 6 comprises FIGS. 6A and 6B and shows the steps of a method according to the present invention.
Figure 6B:
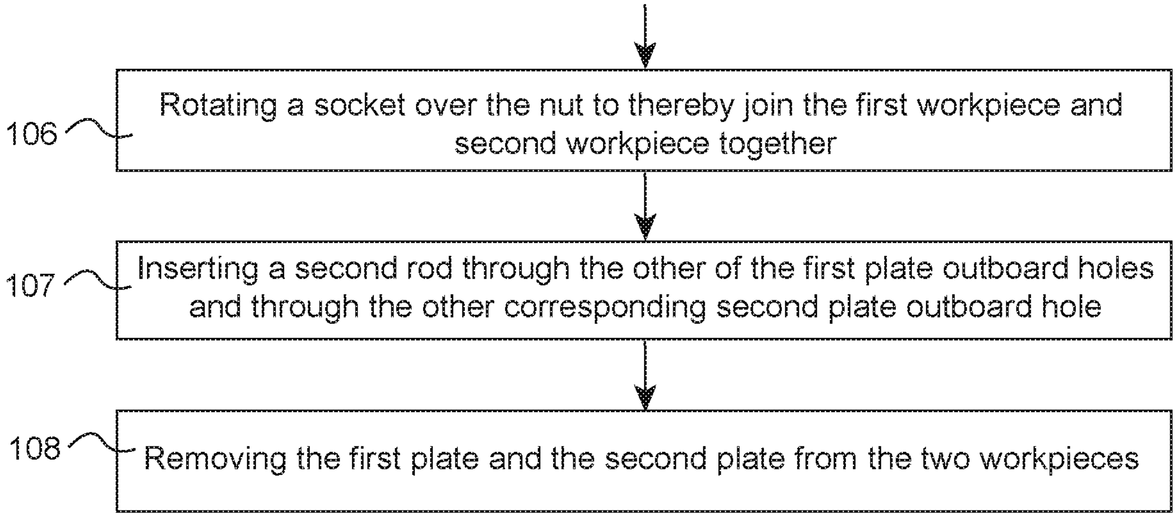

Referring to FIG. 5, once the bolt 15 and nut 16 join the workpieces 35 together the kit 10 may be left in place to facilitate removal and subsequent separation of the workpieces 35. Alternatively, the kit 10 may be removed and deployed elsewhere. The kit 10 may have more than one first plate 12 and/or more than one second plate 13.

In another embodiment, the invention comprises a method of joining two workpieces 35 together 100. The method comprises the steps of providing two plates, a first plate 12 having a first plate 12 outer surface 12OU and a first plate 12 inner surface 12IN opposed thereto, and three primary holes 20, 21 therethrough, a central primary fastener hole 20 having a diameter complementary to a bolt 15 to be inserted therein and two outboard primary holes 21 flanking the central primary fastener hole 20, each outboard primary hole 21 sized to receive a complementary support rod 14 therethrough, the central primary fastener hole 20 having a hexagonal countersink 22 on the outboard face and a second plate 13 having a second plate 13 outer surface 13OU and a second plate 13 inner surface 13IN opposed thereto and three secondary holes 20, 21 therethrough and matched to the position of the three primary holes 20, 21, a central secondary fastener hole 20 having a diameter complementary to a socket for a nut 16 to secure the bolt 15 to be inserted therein and two outboard secondary holes 21 flanking the central secondary fastener hole 20, each outboard secondary hole 21 sized to receive the complementary support rod 14 therethrough 101. The next step to juxtapose the first plate 12 and second plate 13 with a first workpiece 35 and a second workpiece 35 to be joined together and having a respective first workpiece 35 hole therethrough and a second workpiece 35 hole therethrough 102. The next step is inserting a first rod 14 through one of the first plate 12 outboard holes 21 and through a corresponding second plate 13 outboard hole 21 to resist torque in a clockwise direction 103, followed by inserting a hex bolt 15 through the central primary fastener hole 20, the first workpiece 35 hole, the second workpiece 35 hole and the central secondary fastener hole 20 in turn whereby a head 15H of the hex bolt 15 is disposed in the countersink 22 of the first plate 12 and a threaded shank of the hex bolt 15 protrudes though the second plate 13, 104. Preferably the user will then thread a nut 16 onto the threaded shank of the hex bolt 15, 105 followed by rotating a socket over the nut 16 to thereby join the first workpiece 35 and second workpiece 35 together 106. The next step is inserting a second rod 14 through the other of the first plate 12 outboard holes 21 and through the other corresponding second plate 13 outboard hole 21, 107. Optionally the method may comprise removing the first plate 12 and the second plate 13 from the two workpieces 35 108.

It is understood that the step of juxtaposing the first plate 12 and second plate 13 with a first workpiece 35 and a second workpiece 35 to be joined together 102 may comprise positioning either or both of the first plate 12 and/or the second plate 13 to accommodate plural outboard holes 21 and outboard holes 21 on either the first plate 12 or second plate 13 which are larger than the matched outboard holes 21 on the other plate 13, 12.

All values disclosed herein are not strictly limited to the exact numerical values recited. Unless otherwise specified, each such dimension is intended to mean both the recited value and a functionally equivalent range surrounding that value. For example, a dimension disclosed as "40 mm" is intended to mean "about 40 mm." The term "or" as used herein is to be interpreted as an inclusive or meaning any one or any combination. Therefore, "A, B or C" means "any of the following: A; B; C; A and B; A and C; B and C; A, B and C." Every document cited herein, including any cross referenced or related patent or application, is hereby incorporated herein by reference in its entirety unless expressly excluded or otherwise limited. The citation of any document or commercially available component is not an admission that such document or component is prior art with respect to any invention disclosed or claimed herein or that alone, or in any combination with any other document or component, teaches, suggests or discloses any such invention. Further, to the extent that any meaning or definition of a term in this document conflicts with any meaning or definition of the same term in a document incorporated by reference, the meaning or definition assigned to that term in this document shall govern according to Phillips v. AWH Corp., 415F. 3d 1303 (Fed. Cir. 2005). All limits shown herein as defining a range may be used with any other limit defining a range of that same parameter. That is the upper limit of one range may be used with the lower limit of another range for the same parameter, and vice versa. As used herein, when two components are joined or connected the components may be interchangeably contiguously joined together or connected with an intervening element therebetween. A component joined to the distal end of another component may be juxtaposed with or joined at the distal end thereof. While particular embodiments of the present invention have been illustrated and described, it would be obvious to those skilled in the art that various other changes and modifications can be made without departing from the spirit and scope of the invention and that various embodiments described herein may be used in any combination or combinations. It is therefore intended the appended claims cover all such changes and modifications that are within the scope of this invention.

What is claimed is:

1. A kit for assembling and disassembling a threaded fastener, the kit comprising:

a first plate having a first plate outer surface and a first plate inner surface opposed thereto, and three primary holes therethrough, a central primary fastener hole having a diameter complementary to a bolt to be inserted therein and two outboard primary holes flanking the central primary fastener hole, each outboard primary hole sized to receive a complementary support rod therethrough, the central primary fastener hole having a hexagonal countersink on the outboard face; and a second plate having a second plate outer surface and a second plate inner surface opposed thereto and three secondary holes therethrough, a central secondary fastener hole having a diameter complementary to a socket for a nut to secure the bolt to be inserted therein and two outboard secondary holes flanking the central secondary fastener hole, each outboard secondary hole sized to receive the complementary support rod therethrough, the three primary holes and the three secondary holes being matched, whereby a bolt inserted through the central primary fastener hole and the central secondary fastener hole can have a nut applied thereto or removed therefrom without rotation of the first plate or second plate, the rotation being resisted by a support rod inserted through at least one matched pair of an outboard primary outboard hole and an outboard secondary hole.

2. A kit according to claim 1 wherein the three primary holes are colinear and three secondary holes are colinear.

3. A kit according to claim 1 wherein at least one of the outboard primary holes or outboard secondary holes has a hexagonal countersink on the corresponding first plate outer face the second plate outer face.

4. A kit according to claim 3 wherein two of the outboard primary holes or two of the outboard secondary holes have a hexagonal countersink on the corresponding first plate outer face the second plate outer face.

5. A kit according to claim 4 wherein two of the outboard primary holes have a hexagonal countersink on the first plate outer face.

6. A kit according to claim 1 further comprising two support rods adapted to fit through the outboard primary holes and outboard secondary holes and having a length of 4 cm to 10 cm.

7. A kit according to claim 6 wherein the two support rods comprise hex bolts.

8. A kit for assembling and disassembling a threaded fastener, the kit comprising:

a first plate having a first plate outer surface and a first plate inner surface opposed thereto, and three primary holes therethrough, a central primary fastener hole having a diameter complementary to a bolt to be inserted therein and two outboard primary holes flanking the central primary fastener hole, each outboard primary hole sized to receive a complementary support rod therethrough, the central primary fastener hole having a hexagonal countersink on the outboard face; and a second plate having a second plate outer surface and a second plate inner surface opposed thereto and three secondary holes therethrough, a central secondary fastener hole having a diameter complementary to a socket for a nut to secure the bolt to be inserted therein and two outboard secondary holes flanking the central secondary fastener hole, each outboard secondary hole sized to receive the complementary support rod therethrough, the three primary holes and the three secondary holes being matched, whereby a bolt inserted through the central primary fastener hole and the central secondary fastener hole can have a nut applied thereto or removed therefrom without rotation of the first plate or second plate, the rotation being resisted by a support rod inserted through at least one matched pair of an outboard primary outboard hole and an outboard secondary hole, the outboard primary holes and outboard secondary holes being asymmetric with respect to the respective central primary hole and central secondary hole.

9. A kit according to claim 8 having unequal numbers of matched pairs of outboard primary outboard holes and outboard secondary holes on each side of the primary central hole.

10. A kit according to claim 8 having equal numbers of noncolinear matched pairs of outboard primary outboard holes and an outboard secondary holes on each side of the primary central hole.

11. A kit according to claim 8 having matched pairs of outboard primary outboard holes and outboard secondary holes of mutually different diameters.

12. A method of joining two workpieces together, the method comprising the steps of:

a) providing two plates, a first plate having a first plate outer surface and a first plate inner surface opposed thereto, and three primary holes therethrough, a central primary fastener hole having a diameter complementary to a bolt to be inserted therein and two outboard primary holes flanking the central primary fastener hole, each outboard primary hole sized to receive a complementary support rod therethrough, the central primary fastener hole having a hexagonal countersink on the outboard face and a second plate having a second plate outer surface and a second plate inner surface opposed thereto and three secondary holes therethrough and matched to the position of the three primary holes, a central secondary fastener hole having a diameter complementary to a socket for a nut to secure the bolt to be inserted therein and two outboard secondary holes flanking the central secondary fastener hole, each outboard secondary hole sized to receive the complementary support rod therethrough;

b) juxtaposing the first plate and second plate with a first workpiece and a second workpiece to be joined together and having a respective first workpiece hole therethrough and a second workpiece hole therethrough;

c) inserting a first rod through one of the first plate outboard holes and through a corresponding second plate outboard hole to resist torque in a clockwise direction;

d) inserting a hex bolt through the central primary fastener hole, the first workpiece hole, the second workpiece hole and the central secondary fastener hole in turn whereby a head of the hex bolt is disposed in the countersink of the first plate and a threaded shank of the hex bolt protrudes though the second plate;

e) threading a nut onto the threaded shank of the hex bolt;

f) rotating a socket over the nut to thereby join the first workpiece and second workpiece together, where steps c and d are performed in any order.

13. A method according to claim 12 further comprising the step of:

g) inserting a second rod through the other of the first plate outboard holes and through the other corresponding second plate outboard hole, where steps c, d and g are performed in any order before step e.

14. A method according to claim 13 wherein the first rod and the second rod are hex bolts with nuts thereon.

15. A method according to claim 14 wherein the central primary fastener hole is and the two outboard primary fastener holes are colinear.

16. A method according to claim 15 wherein the central primary fastener hole is intermediate the two outboard primary fastener holes.

17. A method according to claim 12 wherein the step of juxtaposing the first plate and second plate with a first workpiece and a second workpiece to be joined together comprises selecting two matched pairs of primary outboard hole and secondary outboard holes from a plurality of more than two pairs of primary outboard holes and secondary outboard holes.

18. A method according to claim 17 wherein the plurality of matched primary outboard holes and secondary outboard holes are asymmetrically spaced about the primary central hole.

19. A method according to claim 17 wherein the step of juxtaposing the first plate and second plate with a first workpiece and a second workpiece to be joined together comprises aligning an elliptical outboard primary hole with an elliptical outboard secondary hole.

20. A method according to claim 12 further comprising the step of removing the first plate and the second plate from the two workpieces.

* * * * *